(12) United States Patent
Senoo

(10) Patent No.: US 11,196,367 B2
(45) Date of Patent: Dec. 7, 2021

(54) CONTROL DEVICE OF ELECTRIC MOTOR AND METHOD FOR CONTROLLING ELECTRIC MOTOR

(71) Applicant: FANUC CORPORATION, Yamanashi (JP)

(72) Inventor: Tatsuya Senoo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/080,941

(22) Filed: Oct. 27, 2020

(65) Prior Publication Data

US 2021/0159823 A1   May 27, 2021

(30) Foreign Application Priority Data

Nov. 25, 2019   (JP) .............................. JP2019-212159

(51) Int. Cl.
  *G05B 19/4103*   (2006.01)
  *H02P 6/16*    (2016.01)
  *H02P 6/24*    (2006.01)

(52) U.S. Cl.
  CPC . *H02P 6/16* (2013.01); *H02P 6/24* (2013.01)

(58) Field of Classification Search
  CPC .......... H02P 6/16; H02P 6/24; G05B 19/4103
  See application file for complete search history.

(56) References Cited

U.S. PATENT DOCUMENTS 7,792,604 B2 *   9/2010   Hong ................. G05B 19/4103
                                              700/188

FOREIGN PATENT DOCUMENTS

JP            2002-018664 A     1/2002

* cited by examiner

*Primary Examiner* — Cortez M Cook
(74) *Attorney, Agent, or Firm* — Studebaker & Brackett PC

(57) ABSTRACT

A control device of an electric motor that drives an axis influenced by gravity includes: a determination unit that determines whether an overrun operation to move past a target position of the axis is allowable; and a drive control unit that, in a case in which it is determined by the determination unit that the overrun operation is allowable and the axis is driven in an antigravity direction, controls driving of the electric motor so that, after the axis being driven to the overrun position past the target position in the antigravity direction, the axis is driven again in a gravity direction to stop at the target position.

8 Claims, 7 Drawing Sheets

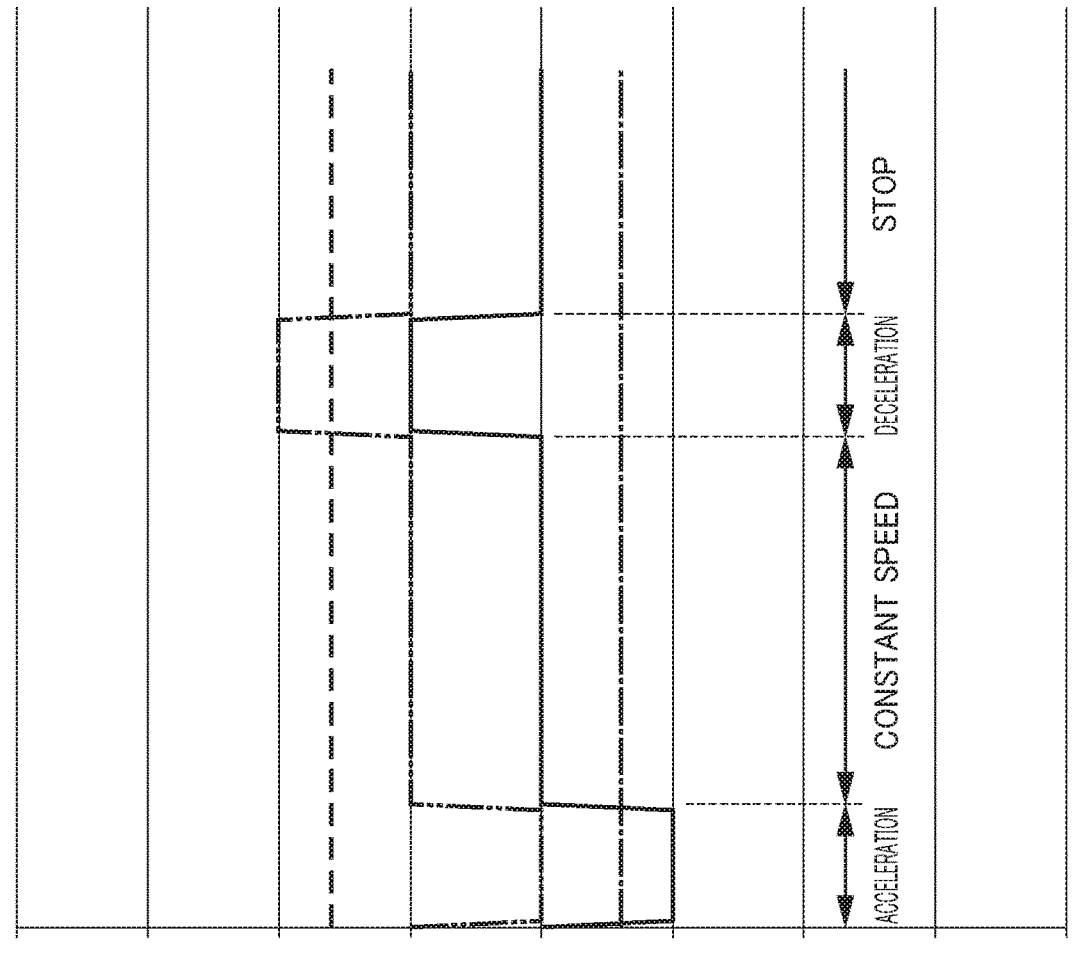

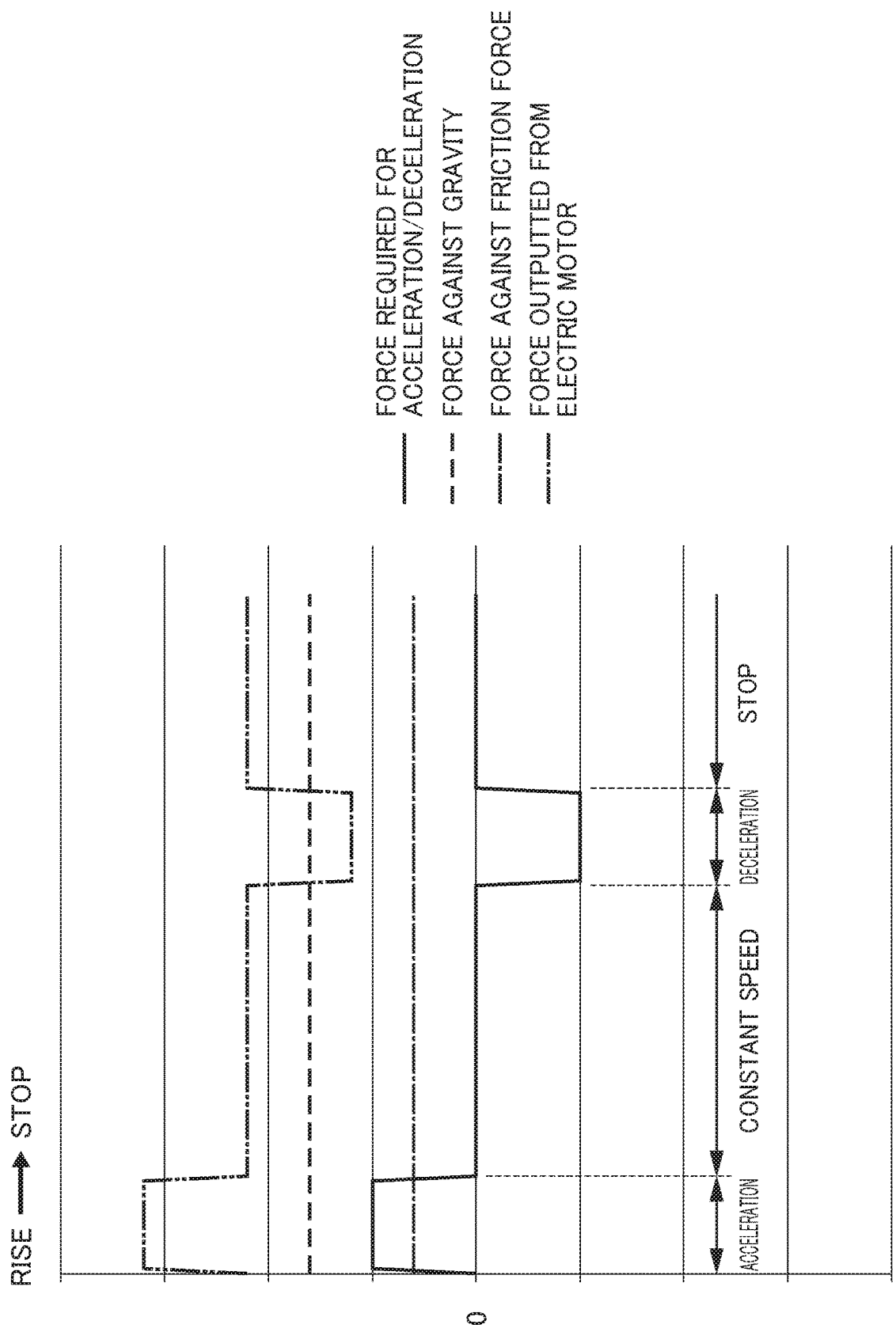

CONTROL DEVICE OF ELECTRIC MOTOR AND METHOD FOR CONTROLLING ELECTRIC MOTOR

This application is based on and claims the benefit of priority from Japanese Patent Application No. 2019-212159, filed on 25 Nov. 2019, the content of which is incorporated herein by reference.

BACKGROUND OF THE INVENTION

Field of the Invention

The present invention relates to a control device of an electric motor and a method for controlling the electric motor.

Related Art

Electric motors used in machine tool perform a positioning operation of a tool or a work piece, and a machining operation such as cutting by driving axes. For example, in a case of a feed axis which is provided in a vertical machining center and moves in the vertical direction, an electric motor for driving the feed axis drives the axis to rise or fall at a constant speed and vertically moves a moving body such as a tool coupled to the feed axis, a table, or a workpiece along the gravity direction, thereby stopping the moving body at the target position.

In a case of driving the axis to vertically move the moving body at a constant speed along the gravity direction, the magnitude of the thrust force (torque) required for the motor is (gravity)+(dynamic friction force) when the moving body rises, and (gravity)−(dynamic friction force) when the moving body falls. Furthermore, when driving of the axis is stopped, a thrust force in the range of (gravity)±(maximum static friction force) is required ((maximum static friction force)>(dynamic friction force)) to prevent the moving body from falling due to gravity. For prior art document, refer to Japanese Unexamined Patent Application, Publication No. 2002-18664.

Patent Document 1: Japanese Unexamined Patent Application, Publication No. 2002-18664

SUMMARY OF THE INVENTION

Generally, the control device of an electric motor changes the thrust force command for driving an axis according to the magnitude of the position deviation (a difference between the target position and the actual position) and, when the axis is stopped, controls the electric motor so as to take over the thrust force command immediately before the stop. Therefore, as shown in FIG. 7, in a case in which the moving body falls in the gravity direction and stops at the target position, the thrust force of the electric motor for driving the axis requires only a thrust force equal to (gravity)−(dynamic friction force). In contrast, as shown in FIG. 8, in a case in which the moving body rises in the antigravity direction and stops at the target position, the thrust force of the electric motor for driving the axis requires a large thrust force equal to (gravity)+(dynamic friction force). Therefore, in a case of driving the axis to rise in the antigravity direction so as to stop the axis at the target position, a wastefully large thrust force is required for the electric motor as compared with the case of driving the axis to fall in the gravity direction so as to stop the axis at the target position. Therefore, in the control of the electric motor, it is desired to be able to reduce the thrust force required for bringing the axis to a stop state.

A control device of an electric motor according to an aspect of the present disclosure is a control device of an electric motor that drives an axis influenced by gravity that includes: a determination unit that determines whether an overrun operation to move past a target position of the axis is allowable; and a drive control unit that, in a case in which it is determined by the determination unit that the overrun operation is allowable and the axis is driven in an antigravity direction, controls driving of the electric motor so that, after the axis being driven to the overrun position past the target position in the antigravity direction, the axis is driven again in a gravity direction to stop at the target position.

The control method or an electric motor according to one aspect of the present disclosure is a method for controlling an electric motor that drives an axis influenced by gravity, and the method includes: determining whether an overrun operation to move past a target position of the axis is allowable, and controlling, in a case in which it is determined that the overrun operation is allowable and the axis is driven in an antigravity direction, driving of the electric motor so that, after the axis being driven to the overrun position past the target position in the antigravity direction, the axis is driven again in a gravity direction to stop at the target position.

According to one aspect, it is possible to provide a control device for an electric motor and a control method for the electric motor which can reduce a thrust force required for bringing an axis to a stop state.

BRIEF DESCRIPTION OF THE DRAWINGS

FIG. 7 is a graph showing a thrust force of an electric motor in a case in which an axis fails in the gravity direction from a stop state and stops; and FIG. 8 is a graph showing a thrust force of an electric motor in a case in which an axis rises in the antigravity direction from the stop state and stops.

DETAILED DESCRIPTION OF THE INVENTION

Figure 1:
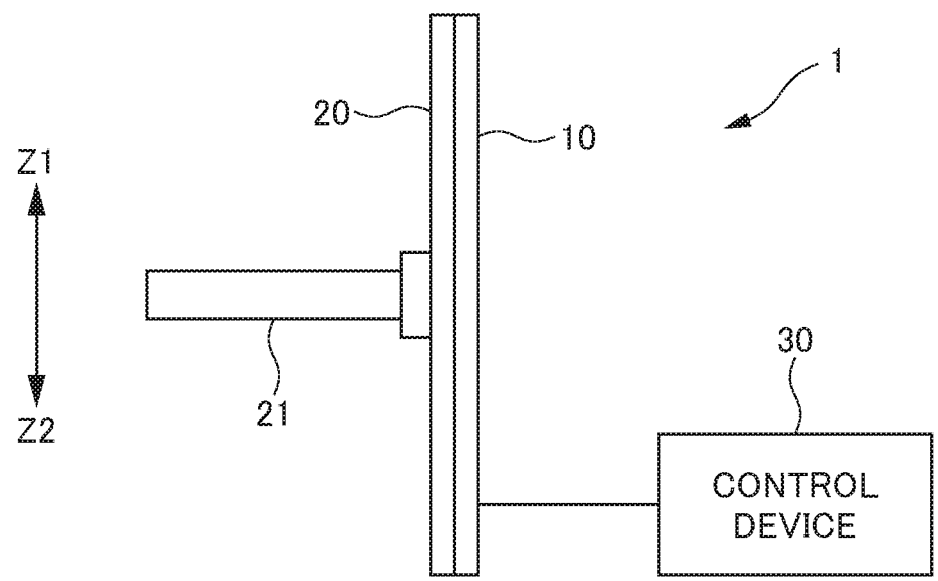
FIG. 1 is a schematic diagram showing a part of a machine tool to which a control device of an electric motor according to one aspect the present disclosure is applied.
Figure 2:
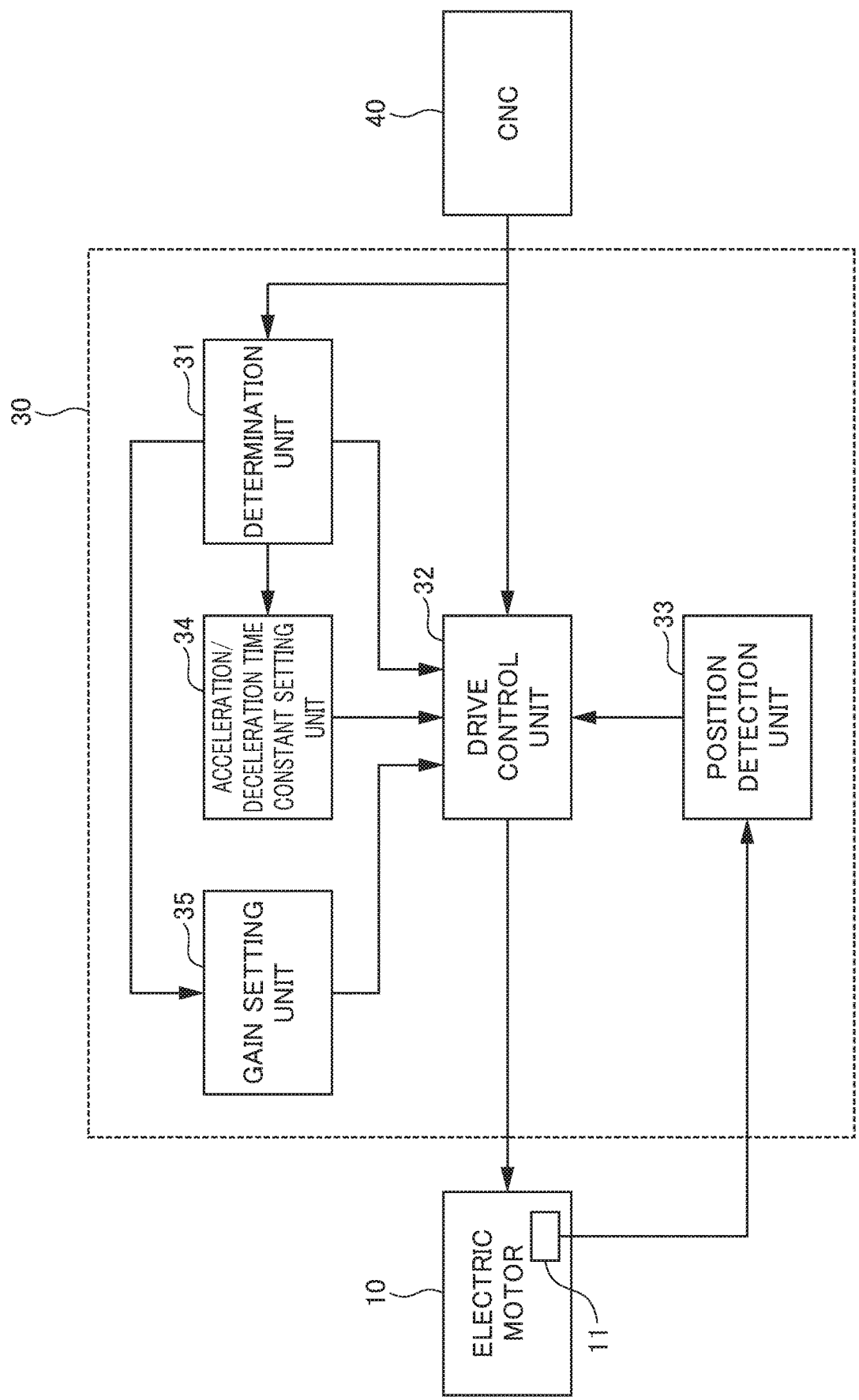
FIG. 2 is a block diagram showing the configuration of a control device of an electric motor a cording to one aspect of the present disclosure.

Hereinafter, an aspect of the present disclosure will be described with reference to the accompanying drawings. FIG. 1 is a schematic diagram showing a part of a machine tool to which a control device of an electric motor according to one aspect of the present disclosure is applied. FIG. 2 is a block diagram showing the configuration of a control device of an electric motor according to one aspect of the present disclosure. As shown in FIG. 1, a machine tool 1 includes an electric motor 10, a feed axis 20 to be driven by the electric motor 10, and a control device 30 for controlling the driving of the electric motor 10.

The electric motor 10 shown in FIG. 1 is constituted by a linear motor, and drives the feed axis 20 extending linearly along the gravity direction (Z-axis). The electric motor 10 drives the feed axis 20, and the feed axis 20 drives a moving body 21 attached to the feed axis 20 to rise in the antigravity direction (Z1 direction) and to fall in the gravity direction (Z2 direction) toward the target position. Therefore, the feed axis 20 is an axis which is influenced by the gravity. The moving body 21 is, for example, a spindle comprising a tool to be used in the machine tool 1, a workpiece which is a machining target object, a table for supporting the workpiece, etc.

As shown in FIG. 2, the control device 30 performs drive control of the electric motor 10 based on a drive command to be sent from the numerical control device 40 including, for example, CNC (Computerized Numerical Control). As described above, the thrust force of the electric motor required for driving the axis smaller in the case in which the axis is driven to fall in the gravity direction and stop at the target position than the case in which the axis is driven to rise in the antigravity direction to stop at the target position. Therefore, in a case of driving the moving body 21 to rise in the antigravity direction and stop at the target position, in order to reduce the thrust force of the electric motor 10, the control device 30 controls the electric motor 10 so as to drive the feed axis 20 in the gravity direction and stop at the target position.

For this purpose, the control device 30 is configured to include a determination unit 31, a drive control unit 32, a position detection unit 33, an acceleration/deceleration time constant setting unit 34, and a gain setting unit 35. It should be noted that the configuration of the control device 30 can be generally realized by a servo control device of the electric motor 10. Although the control device 30 shown in FIG. 2 is described as a device in which the respective components are collectively arranged, the arrangement location of the respective components of the control device 30 is not particularly limited. The function of some or all of the control devices 30 may be achieved by a numerical control device 40 or other external devices.

The determination unit 31 analyzes the drive command of the electric motor 10 based on a machining program sent from the numerical control device 40. The drive command of the electric motor 10 includes information of a target position (a target position to which the moving body 21 moves) at the time of driving the feed axis 20 of the machine tool 1, information of a moving direction (Z1 direction or Z2 direction) to the target position, information of a purpose (positioning operation, cutting operation, etc.) of the drive operation of the feed axis 20, and the like. The determination unit 31 analyzes the drive command, and thereby determines whether the driving direction of the feed axis 20 for moving the moving body 21 to the target position is in the antigravity direction, and determines whether an overrun operation is possible when driving the feed axis 20.

The overrun operation of the feed axis 20 is an operation of driving the feed axis 20 so as to move the moving body 21 again to the target position after the moving body 21 having moved to an overrun position past the target position. The overrun operation is applied to a case in which the driving direction to the target position of the feed axis 20 includes the antigravity direction (Z1 direction in FIG. 1). In the case of the feed axis 20 shown in FIG. 1, the overrun position is a position at which the feed axis 20 rises by a predetermined distance in the antigravity direction (Z1 direction) with respect to the target position. Therefore, in the overrun operation, the moving body 21 which has risen to the overrun position and has stopped fails from the overrun position to the target position and stops at the target position.

No problems will arise in the overrun operation in a case in which the drive of the feed axis 20 a drive for the positioning operation of the moving body 21. However, the overrun operation is an operation that goes past the target position. For this reason, in a case in which the drive of the feed 20 is a drive for the cutting operation of cutting a workpiece, there is a possibility of affecting the machining quality Therefore, as a result of the analysis of the drive command, in a case in which it is determined that the driving direction to the target position of the feed axis 20 is in the antigravity direction, the determination unit 31 determines whether the overrun operation is allowable or not, depending on the purpose of the drive operation of the feed axis 20 in the drive command of the electric motor 10. More specifically, in a case in which the driving of the feed axis 20 is a drive for the positioning operation in the machine tool 1, the determination unit 31 determines that the overrun operation is allowable, and in a case in which the driving of the feed axis 20 is a drive for the cutting operation in the machine tool 1, the determination unit 31 determines that the overrun operation is not allowable.

In a case in which it is determined that the drive direction of the feed axis 20 to the target position is in the antigravity direction, and the overrun operation when driving the feed axis 20 is allowable, the determination unit 31 outputs a determination result to the drive control unit 32, the acceleration/deceleration time constant setting unit 34, and the gain setting unit 35.

The drive control unit 32 analyzes the drive command of the electric motor 10 sent from the numerical control device 40. The drive control unit 32 determines the target position (target coordinate) when driving the feed axis 20 based on the analysis result and the position information of the feed axis 20 sent from the position detection unit 33 to be described later. Thereafter, the drive control unit 32 can calculate a target position command based on the target position. The target position command is outputted to the electric motor 10 when driving the feed axis 20 so that the moving body 21 moves in the normal operation to the target position.

Furthermore, in a case in which a determination result is inputted from the determination unit 31 indicating that the driving direction of the feed axis 20 to the target position is in the antigravity direction, and the overrun operation when driving the feed axis 20 is allowable, the drive control unit 32 determines the overrun position (overrun coordinate) of the drive of the feed axis 20. Thereafter, the drive control unit 32 can calculate an overrun position command based on the overrun position. The overrun position command is outputted to the electric motor 10 when driving the feed axis 20 to fail to the target position after the moving body has passed the target position and risen to the overrun position. The overrun position may be set to a position away from the target position by a predetermined fixed distance, or may be set so as to be different with respect to the target position each time depending on, for example, the type, weight, moving distance, moving speed, and the like of the moving body 21.

The overrun position command includes a first thrust force command for driving the feed axis 20 so that the moving body 21 rises from the current position to the overrun position, and a second thrust force command for driving the feed axis 20 so that the moving body 21 falls from the overrun position to the target position. As described above, the thrust force of the electric motor 10 is smaller in driving the feed axis 20 so as to drive the moving body 21 to fall in the gravity direction than in driving the feed axis 20 so as to rise in the antigravity direction. For this reason, the magnitude of the thrust force of the electric motor 10 is in the relationship of the first thrust force command>second thrust force command.

As shown in FIG. 2, the position detection unit 33 detects the position of the feed axis 20 (this is also referred to as the position f the moving body 21) based on a position detection signal outputted from a position detector 11 such as an encoder provided in the electric motor 10. The posit on information of the feed axis 20 detected by the position detection unit 33 outputted to the drive control unit 32 described above.

The acceleration/deceleration time constant setting unit 34 sets an acceleration/deceleration time constant accompanied with the acceleration/deceleration of the electric motor 10 at the time of driving of the feed axis 20. For the acceleration/deceleration time constant setting unit 34, at least two large and small time constants are set. The acceleration/deceleration time constant setting unit 34 selects one of the at least two time constants, and outputs to the drive control unit 32. More specifically, in a case of executing the overrun operation, the acceleration/deceleration time constant setting unit 34 changes the time constant to be outputted to the drive control unit 32 to a larger time constant. The overrun operation is an operation of immediately falling to the target position without holding the stop state after stopping once at the overrun position. For this reason, the shock acting on the feed axis 20 and the moving body 21 may become large. If the acceleration/deceleration time constant is greatly changed, the acceleration and the deceleration at the time of driving of the feed axis 20 becomes relatively slow. Therefore, the impact applied to the feed axis 20 or the moving body 21 at the time of the overrun operation is reduced.

The gain setting unit 35 sets the gain at the time of driving the feed axis 20. During the overrun operation, the thrust force of the motor 10 is changed from (gravity)+(dynamic friction force) to (gravity)−(dynamic friction force). Therefore, when the dynamic friction torque is large, the thrust force of the motor 10 to be changed during the overrun operation also increases. Furthermore, since the position deviation tends to become small during the overrun operation, it may take a long time to change the thrust force of the electric motor 10 according to the position deviation. Therefore, the gain setting unit 35 functions to increase the gain to be outputted to the drive control unit 32 when executing the overrun operation. By increasing the gain, the change time of the thrust force of the electric motor 10 is shortened, and the time for driving the feed axis 20 from the overrun position to the target position is also shortened.

The type of gain to be changed by the gain setting unit 35 may be any one of the position loop gain and the speed loop gain, or may be both the position loop gain and the speed loop gain.

Figure 3:
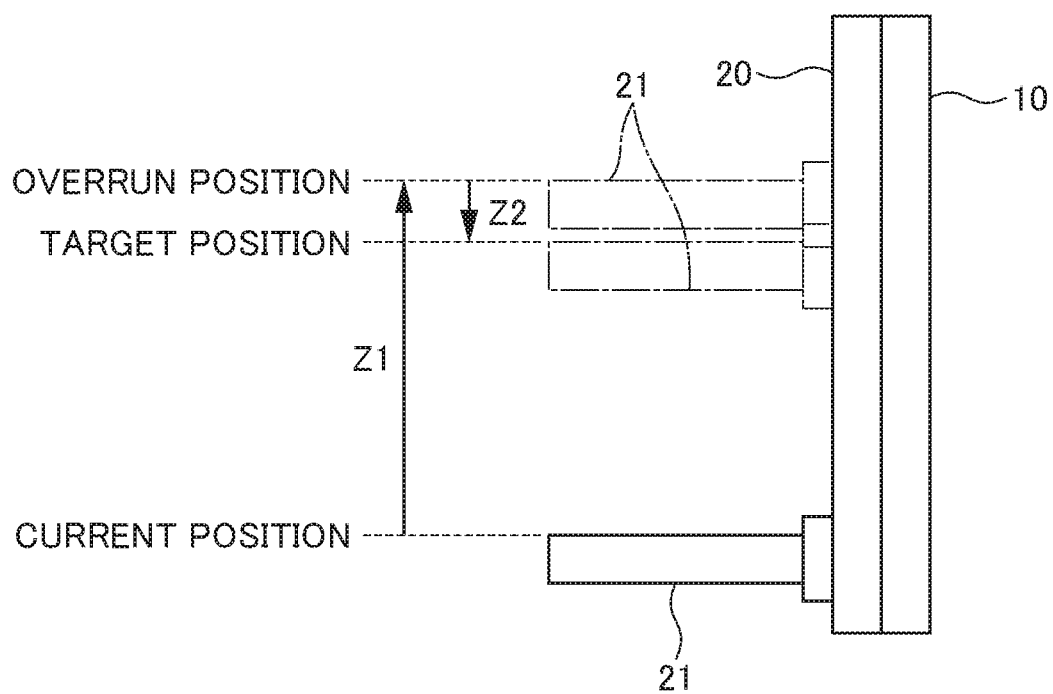
FIG. 3 a schematic diagram for explaining the drive of an axis controlled by a control device of an electric motor according to one aspect of the present disclosure.
Figure 4:
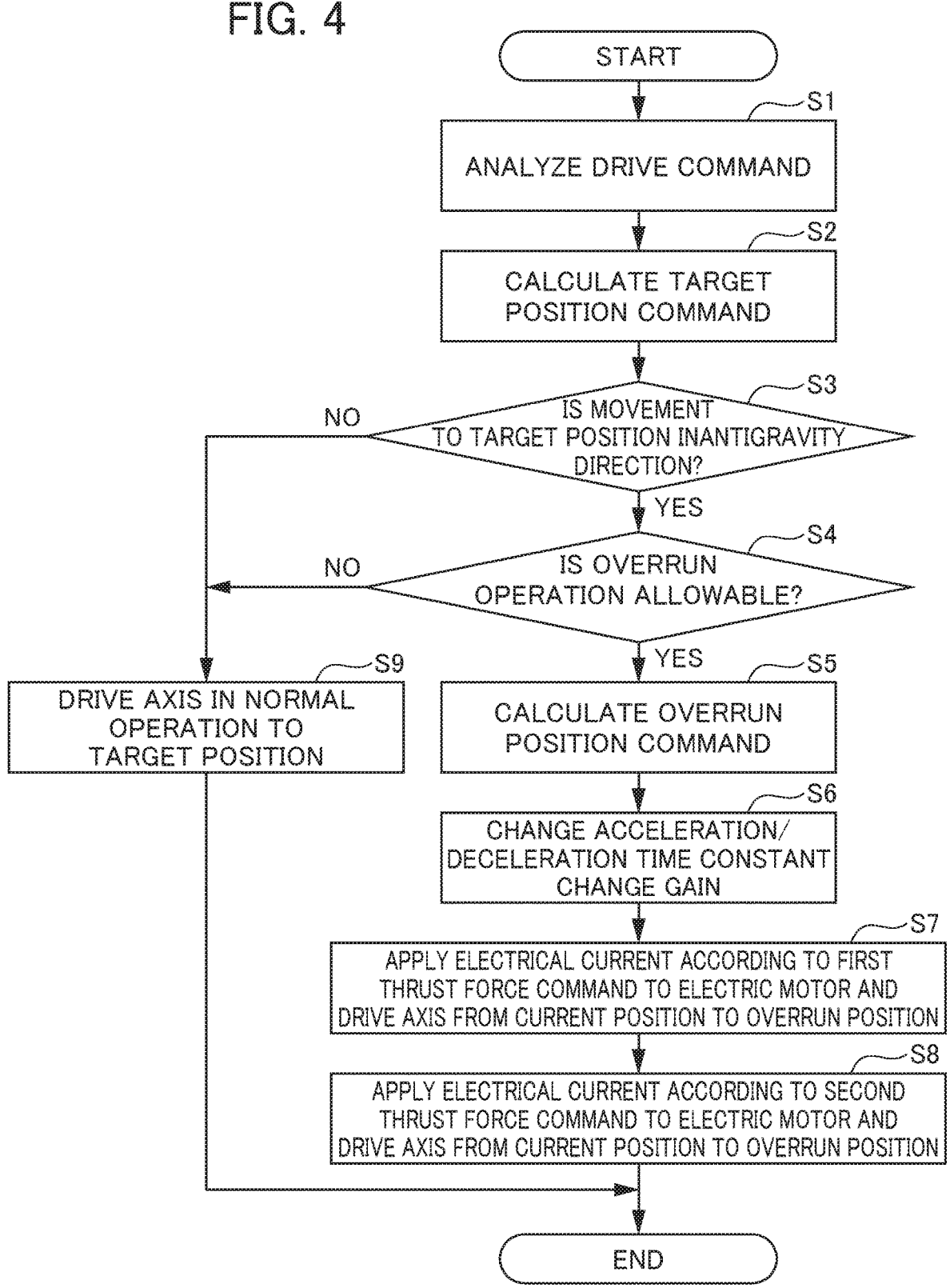
FIG. 4 is a flowchart for explaining a drive control of an axis by a control device of an electric motor according to one aspect of the present disclosure.

Next, a specific control method of the electric motor 10 by the control device 30 will be described with reference to FIGS. 3 and 4. FIG. 3 is a schematic diagram illustrating the drive of the feed axis 20 controlled by the control device 30. FIG. 4 is a flowchart for explaining the drive control of the feed axis 20 by the control device 30. Here, as shown in, FIG. 3, the feed axis 20 will be described as driving so as to move the moving body 21 which is being stopped at the current position to the target position by causing to rise in the Z1 direction which is the antigravity direction.

First, the control device 30 analyzes the drive command based on the machining program sent from the numerical control device 40 in the drive control unit 32 (Step S1). Thereafter, in the drive control unit 32, the control device 30 determines the target position at the time of driving the feed axis 20 based on the analysis result and the position information of the feed axis 20 sent from the position detection unit 33, and calculates a target position command (Step S2).

The drive command from the numerical control device 40 is also sent to the determination unit 31 (see FIG. 2) The control device 30 determines, in the determination unit 31, whether the movement to the target position of the moving body 21 is in the antigravity direction based on the drive command (Step S3). In a case in which the movement is in the antigravity direction (Step S3: YES), the control device 30 further determines whether or not the overrun operation is possible based on the drive command in the determination unit (Step S4).

In Step S4, in a case in which it is determined that the drive of the feed axis 20 is a drive for the positioning operation, and the overrun operation is possible (Step S4: YES), the control device 30 determines the overrun position based on the target position in the drive control unit 32. Then, the control device 30 calculates an overrun position command including the first thrust force command and the second thrust force command based on the overrun position (Step S5). Thereafter, the control device 30 changes the time constant set in the acceleration/deceleration time constant setting unit 34 to a large time constant, and changes to increase the gain to be set in the gain setting unit 35 (Step S6).

Then, the control device 30 first applies a current corresponding to the first thrust force command of the overrun position command to the electric motor 10 to drive the feed axis 20. As a result, the feed axis 20 drives the moving body 21 to rise from the current position to the overrun position in the Z1 direction, which is in the antigravity direction (Step S7).

After the moving body 21 rising to the overrun position, the control device 30 applies a current corresponding to the second thrust force command of the overrun position command to the electric motor 10 to drive the feed axis 20. Thus, the feed axis 20 drives the moving body 21 to fall from the overrun position to the target position in the Z2 direction which is the gravity direction (Step S8).

When the moving body 21 falls from overrun position to the target position in Step S8, the feed axis 20 holds the moving body 21 in a stopped state at the target position. The thrust force of the electric motor 10 for the feed axis 20 to hold the stopped state at this time is, as shown in FIG. 7, a small thrust force equal to (gravity)−(dynamic friction force). Therefore, the thrust force required for the electric motor 10 is reduced as compared with the case of driving in the normal operation from the current position to the target position.

It should be noted that, when it is determined in Step S3 that the movement to the target position is not in the antigravity direction (Step S3: NO), or when it is determined in Step S4 that the overrun operation is not allowable (Step S4: NO), the processing advances to Step S9. In Step S9, the control device 30 applies a current corresponding to the normal thrust force command to the electric motor 10. Thus, the control device 30 drives the feed axis 20 so that the moving body 21 rises in the normal operation from the current position to the target position.

In the flowchart described above, the control device 30 controls the electric motor 10 to execute the overrun operation without exception in a case in which the movement to the target position is in the antigravity direction, and the overrun operation is allowable. However, in a case in which the time for holding a state in which the feed axis 20 is being stopped at the target position is short, only a small amount of force of the electric motor 10 is needed. Therefore, there may be a case in which the control device 30 does not necessarily control the electric motor 10 to execute the overrun operation. The stop time of the feed axis 20 can be determined by analyzing the drive command based on the machining program to be sent from the numerical control device 40. Therefore, for example, a step of determining whether or not the stop time of the feed axis 20 is shorter than the time set as a threshold value in advance may be added between any one of Steps S2 and S3, S3 and S4, or S4 and S5 in FIG. 4. In such a case, when it is determined that the stop time of the feed axis 20 is shorter than the time set as a threshold, the processing advances to Step S9 while the control device 30 does not execute the overrun operation, and the control device 30 controls the electric motor 10 so as to drive the feed axis 20 in the normal operation.

Figure 5:
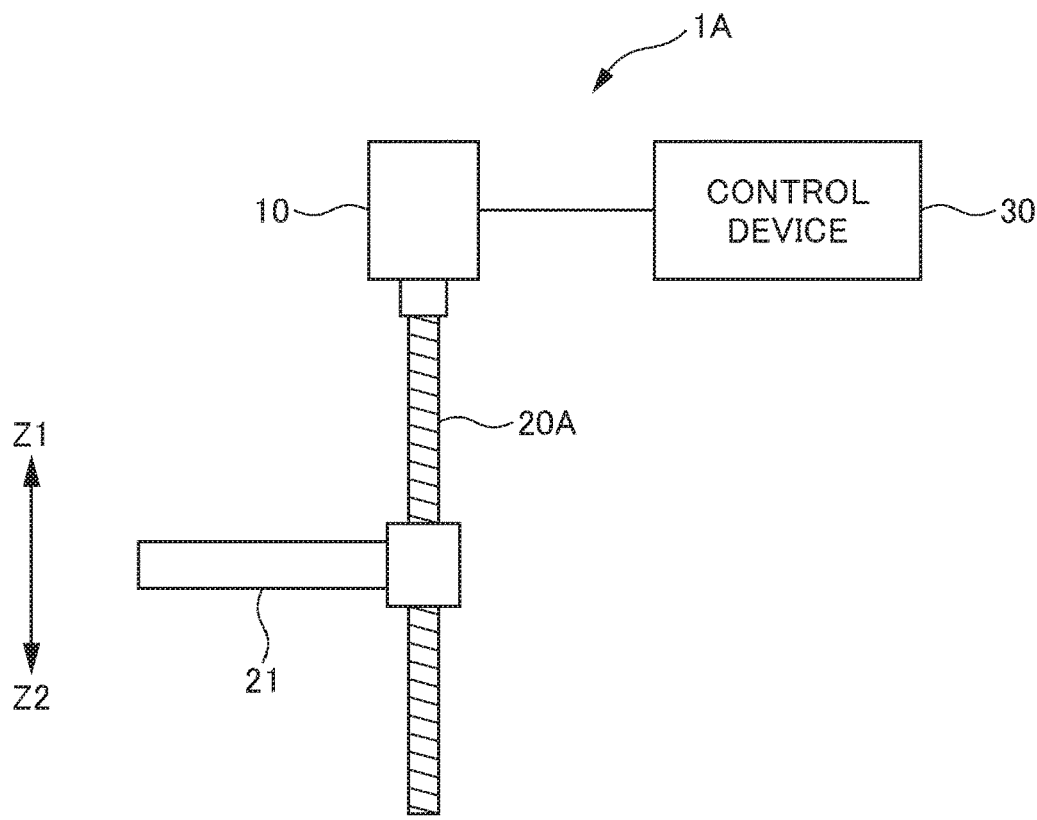
FIG. 5 is a schematic diagram showing a part of another machine tool to which a control device of an electric motor according to one aspect of the present disclosure is applied.

The axis driven by the electric motor 10 may be any axis affected by gravity, and is not limited to the feed axis 20 of the linear motor shown in FIG. 1. For example, as shown in FIG. 5, the axis may be configured by a ball screw 20A coupled to the drive axis of the electric motor 10. The ball screw 20A extends in a direction following gravity. The moving body 21 is fit on the ball screw 20A, and vertically moves by the rotation drive of the electric motor 10.

Figure 6:
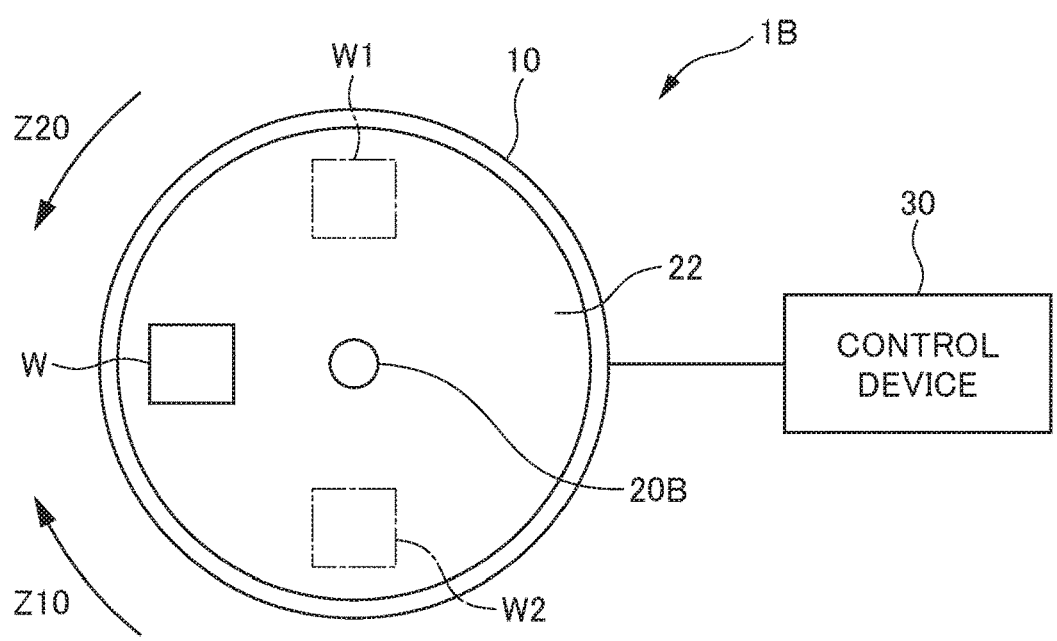
FIG. 6 is a schematic diagram showing a part of still another machine tool to which a control device of an electric motor according to one aspect of the present disclosure is applied.

Furthermore, the axis may not be driven linearly along the gravity direction. Therefore, for example, as shown in FIG. 6, the drive axis 20B of the electric motor 10 may be used. In this case, the drive axis 20B is disposed in a direction intersecting with the gravity direction (for example, in the horizontal direction). A disc-shaped surface plate 22 is attached to the drive axis 20B, and the workpiece W as a moving body is supported so as to be eccentric to the surface of the surface plate 22. For example, when the drive axis 20B of the electric motor 10 is driven in the counterclockwise direction, the workpiece W1 denoted by a one-dot chain line on the upper side of the face plate 22 moves in the Z20 direction along the gravity direction, and moves to the position (target position) of the workpiece W denoted by the solid line. However, when the drive axis 20B is driven in the clockwise direction, the workpiece W2 indicated by the one-dot chain line on the lower side of the face plate 22 moves in the Z10 direction along the antigravity direction, and moves to the position (target position) of the workpiece W denoted by the solid line. Therefore, when driving the drive axis 20B so that the workpiece W2 moves to the position of the workpiece W, it is possible for the control device 30 to reduce the thrust force of the electric motor 10 by executing the overrun operation described above.

It should be noted that the overrun operation is acceptable so long as it may be finally operated to stop at the target position, and hence it is not limited to the case of passing the target position and moving to the overrun position. Therefore, for example, as shown in FIG. 6, the overrun operation may be an operation in which the workpiece W1 located on the upper side of the face plate 22 moves in the clockwise direction, and finally stops at the position of the workpiece W which is the target position.

EXPLANATION OF REFERENCE NUMERALS 1 machine tool
10 electric motor
20 feed axis
30 control device
31 determination unit
32 drive control unit
34 acceleration/deceleration time constant setting unit
35 gain setting unit

What is claimed is:

1. A control device or an electric motor that drives an axis influenced by gravity, the control device comprising:
   a determination unit that determines whether an overrun operation to move past a target position of the axis is allowable; and
   a drive control unit that, in a case in which it is determined by the determination unit that the overrun operation is allowable and the axis is driven in an antigravity direction, controls driving of the electric motor so that, after the axis being driven to the overrun position past the target position in the antigravity direction, the axis is driven again in a gravity direction to stop at the target position.

2. The control device of the electric motor according to claim 1, wherein
   the axis is an axis for use in a positioning operation and a cutting operation in a machine tool, and
   the determination unit determines that, in a case in which the driving of the axis is driving for the positioning operation, the overrun operation is allowable, and determines that, in a case in which the driving of the axis is driving for the cutting operation, the overrun operation is not allowable.

3. The control device of the electric motor according to claim 1, further comprising an acceleration/deceleration time constant setting unit that sets an acceleration/deceleration time constant at a time of the driving of the axis,
   wherein, in a case of executing the overrun operation, the acceleration/deceleration time constant setting unit changes the acceleration/deceleration time constant to be larger.

4. The control device of the electric motor according to claim 1, further comprising a gain setting unit that sets a gain at the time of the driving of the axis,
   wherein, in a case of executing the overrun operation, the gain setting unit changes to increase the gain.

5. A method for controlling an electric motor that drives an axis influenced by gravity, the method comprising:
   determining whether an overrun operation to move past a target position of the axis is allowable, and
   controlling, in a case in which it is determined that the overrun operation is allowable and the axis is driven in an antigravity direction, driving of the electric motor so that, after the axis being driven to the overrun position past the target position in the antigravity direction, the axis is driven again in a gravity direction to stop at the target position.

6. The method according to claim 5, wherein the axis is an axis for use in a positioning operation and a cutting operation in a machine tool, the method further comprising determining that, in a case in which the driving of the axis is driving for the positioning operation, the overrun operation is allowable, and determining that, in a case in which the driving of the axis is driving for the cutting operation, the overrun operation is not allowable.

7. The method according to claim 5, further comprising, in a case of executing the overrun operation, changing an acceleration/deceleration time constant at a time of the driving of the axis to be larger.

8. The method according to claim 5, further comprising, in a case of executing the overrun operation, changing to increase the gain at the time of the driving of the axis.

* * * * *